United States Patent [19]
Rosaen

[11] 3,724,269
[45] Apr. 3, 1973

[54] FLUID DEVICE HAVING FLOW CONTROL AND INDICATING MEANS

[76] Inventor: Nils O. Rosaen, 3774 Quarton Road, Bloomfield Hills, Mich.

[22] Filed: June 29, 1970

[21] Appl. No.: 50,651

[52] U.S. Cl. .................................... 73/207, 73/228
[51] Int. Cl. .............................................. G01f 1/00
[58] Field of Search ..... 73/228, 207; 277/116.2, 117, 277/121

[56] References Cited

UNITED STATES PATENTS

| | | | |
|---|---|---|---|
| 1,098,247 | 5/1914 | Gibbs | 73/211 |
| 2,020,588 | 11/1935 | Stuart | 73/207 |
| 2,401,379 | 6/1946 | Smith | 277/117 |
| 3,282,102 | 11/1966 | Rosaen | 73/228 |
| 2,103,262 | 12/1937 | Knerr | 73/228 |

*Primary Examiner*—Jerry W. Myracle
*Attorney*—Hauke, Gifford and Patalidis

[57] ABSTRACT

A fluid device having a housing with an inlet and an outlet respectively adapted to be connected to a source of fluid and a fluid user. A valving mechanism carried within the housing between the inlet and the outlet selectively controls the maximum rate of fluid flow therebetween, while a semi-circular vane is movable in response to a change in the flow rate between the inlet and the outlet to rotate a shaft which extends externally of the housing and is operatively coupled to an indicator for providing an external visual indication of the actual rate of flow through the device. The externally mounted indicator includes an electrically operated device responsive to the rotation of the shaft to provide an electrical signal to a remotely mounted indicator.

The shaft extends through a sealing plug having a tapered pipe thread on its outer surface which is adapted to engage a mating tapered pipe thread formed in a bore of the housing in such a manner that an O-ring disposed at the inner end of the sealing plug is radially, inwardly compressed as the sealing plug is threadedly engaged within the bore to thereby form a fluid tight seal around the shaft.

11 Claims, 10 Drawing Figures

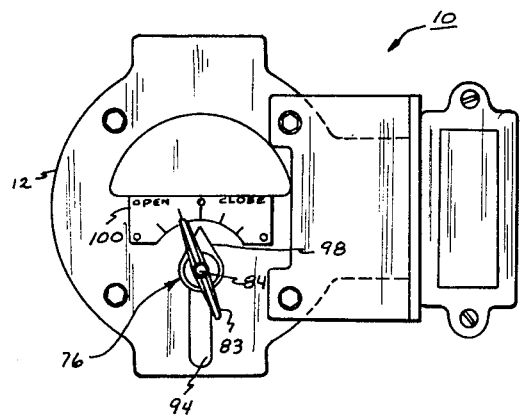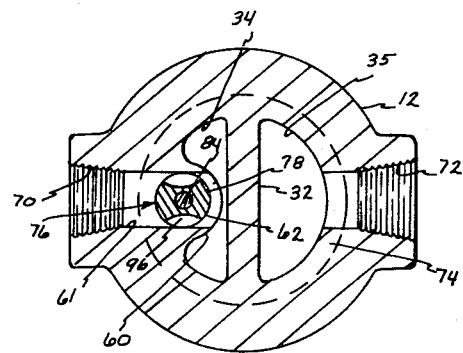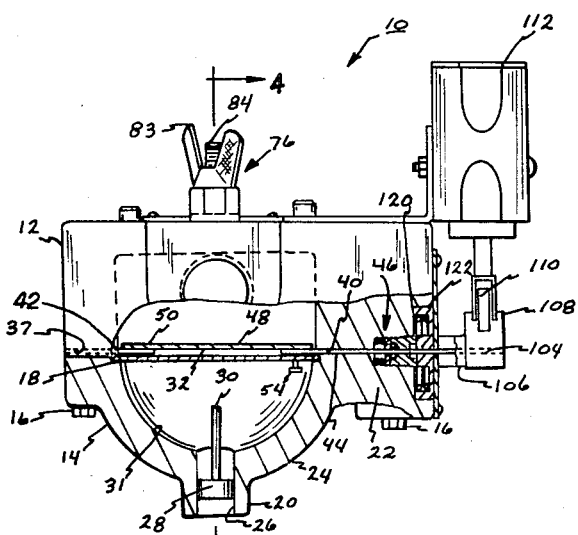

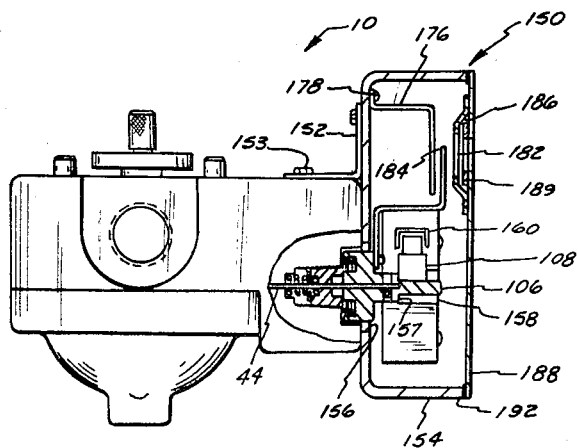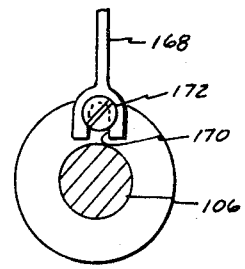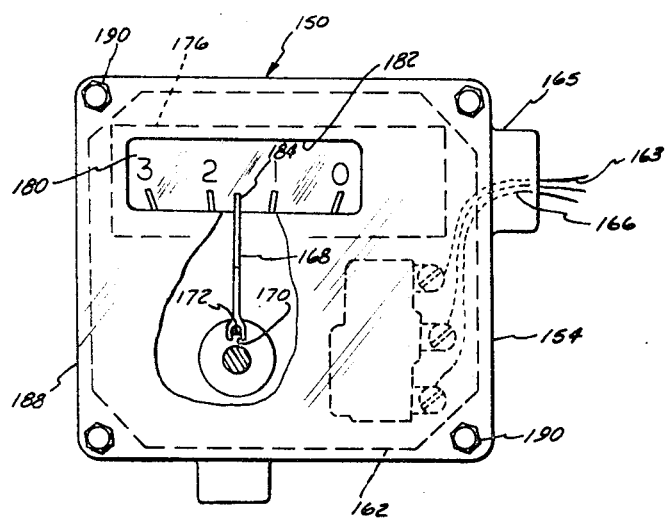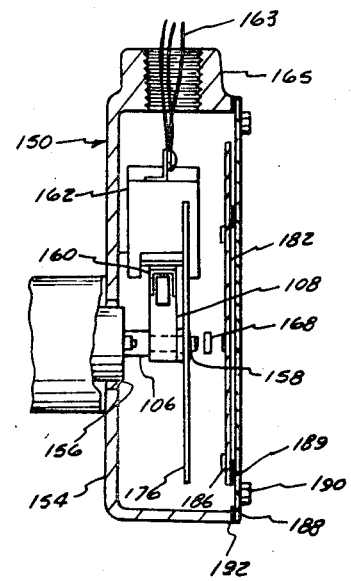
FIG-7
FIG-10
FIG-9
FIG-8
INVENTOR
NILS O. ROSAEN
BY
Hauke Gifford & Patalidis
Attorneys

FLUID DEVICE HAVING FLOW CONTROL AND INDICATING MEANS

BACKGROUND OF THE INVENTION

1. Field of the Invention

The present invention relates to fluid systems, and more particularly to a fluid device for simultaneously controlling the maximum rate of fluid flow through such systems and for indicating the actual rate of such fluid flow.

2. Description of the Prior Art

A variety of measuring instruments and the like are now available for supplying information as to the rate of flow in a fluid system. These instruments may be broadly divided into positive displacement meters and rate meters. In the former type of flow meter, pistons or partitions are displaced by the flowing fluid and a suitable mechanism records or indicates the displacement. In the rate meter (e.g. venturi meters, elbow meters), the pressure is measured at various points along a special section of narrow or bent pipe and the amount of flow is calculated from the pressure differential.

Although these various types of measuring devices can be manufactured to provide very accurate measurement, they are expensive to construct and install, and difficult to operate. As a result, their use is necessarily limited to expensive hydraulic installations for equipment operated by highly skilled personnel. Further, such devices do not provide an integral means for controlling the rate at which fluid flows in the fluid system.

Of the two types of meters, the positive displacement meters are the most economical to manufacture, however, such flow meters have not generally been very accurate over a wide range of fluid flow. Further, such positive displacement meters have an indicating device mounted exteriorly of the housing for indicating the amount of flow passing therethrough and thus a shaft must be utilized to operatively couple the displaceable piston or partition within the housing to the externally mounted indicating means. It has been a problem in such prior devices to provide a suitable sealing means which will insure a fluid tight seal around the shaft, while at the same time providing a positive displacement meter which is still the most economical to manufacture.

A patent issued to Nils O. Rosaen, U.S. Pat. No. 3,282,102, on Nov. 1, 1966, discloses an example of a positive displacement flow indicator which alleviates a number of the heretofore described disadvantages.

The present invention represents an improvement over the invention disclosed and claimed in the aforementioned patent in that it provides a flow indicator having a valve mechanism for selectively controlling the maximum rate of fluid flow to a fluid system simultaneously with providing means for indicating externally of the device the actual rate of such flow. The present invention also provides an improved means for sealing the shaft which operatively couples the externally mounted indicating means to the internal fluid responsive piston or partitions.

SUMMARY OF THE INVENTION

The present invention, which will be described subsequently in greater detail, comprises a fluid device having an inlet port and an outlet port with a valve mechanism and flow responsive vane carried by the housing between the inlet and outlet ports, the flow responsive vane being operatively coupled to an externally mounted indicator. The valve mechanism and the indicating means are respectively adapted to control the maximum rate of flow through the device and to give a visual indication exteriorly of the device of the actual flow rate. The fluid responsive member is operatively coupled to the indicating means by means of a shaft passing through a tapered sealing plug having a tapered pipe thread on its outer surface which threadedly engages a mating tapered pipe thread formed in the housing. The engagement radially, inwardly compresses an O-ring carried by the sealing plug member into a sealing engagement around the shaft to prevent leakage of fluid along the shaft.

It is therefore an object of the present invention to provide an improved fluid device having a flow indicator and a valve mechanism disposed between the inlet and outlet for indicating and controlling the flow rate respectively.

It is also an object of the present invention to provide an improved fluid device of the type having a flow responsive vane member rotatably carried about a shaft which is operatively coupled to an indicating means mounted exteriorly of the housing and which includes a novel sealing means for preventing leakage externally of the fluid device.

It is also an object of the present invention to provide an improved flow indicator for such fluid devices.

Other objects, advantages, and applications of the present invention will become apparent to those skilled in the art of such fluid devices when the accompanying description of an example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a top elevational view of a fluid device incorporating the present invention;

FIG. 2 is a partially sectioned front view of the fluid device illustrated in FIG. 1;

FIG. 3 is a side elevational view of the fluid device illustrated in FIG. 2;

FIG. 4 is a cross sectional view of the fluid device illustrated in FIG. 2 and taken along line 4—4 thereof;

FIG. 5 is an enlarged fragmentary cross sectional view of the fluid device illustrated in FIG. 2;

FIG. 6 is an enlarged fragmentary cross sectional view of the fluid device illustrated in FIG. 4 and taken along line 6—6 thereof;

FIG. 7 is a front elevational, partially sectioned view of a fluid device incorporating a modification of the present invention;

FIG. 8 is a partially sectioned view of the fluid device illustrated in FIG. 7;

FIG. 9 is a partially sectioned side elevational view of the fluid device illustrated in FIG. 7 and FIG. 10 is a fragmentary, enlarged view of the fluid device illustrated in FIG. 7.

DESCRIPTION OF THE PREFERRED EMBODIMENTS

Referring to the drawings and particularly FIGS. 1–6 for a more detailed description of the present invention, one preferred embodiment thereof is illustrated in the form of a fluid device 10 comprising a generally cylindrically shaped housing 12 and a bowl 14 which is fixed in a fluid tight position across the lower end of the housing 12 by means of screws 16 and a resilient O-ring seal 18.

The bowl 14 includes a cylindrical stem 20, an annular flange 22 abutting the housing 12 through which the screws 16 extend, and an annular curved portion 24 joining the stem 20 and the flange 22. The stem 20 is bored axially at 26 so as to provide communication with the interior of the bowl 14 and the housing 12. A plug 28 is insertable in a fluid type relationship in the bore 26 and carries a pin 30 which extends upwardly into the interior of the bowl 14. The interior of the bowl 14 is curved to form a substantially spherical surface 31 which will be described in greater detail hereinafter.

A vertical partition 32 (FIG. 4) projects perpendicularly downwardly from an upper wall 33 toward the bowl 14 and divides the interior of the housing 12 generally into two spaces 34 and 35. As can best be seen in FIG. 2, the housing 12 has a pair of axially aligned bores 37 and 40, the axes of which are generally parallel to the partition 32. The bores 37 and 40, respectively, accommodate supporting shafts 42 and 44. The supporting shaft 42 is fixedly mounted within the bore 37 by any suitable means such as a press fit, while the supporting shaft 44 is rotatably mounted in the bore 40 and extends externally of the housing 12 through a sealing plug 46 which provides both a mounting means for the shaft 44 as it rotates and a sealing means to prevent the leakage of fluid from the interior of the bowl 14 all of which will be described in greater detail hereinafter.

A vane member 48 of a generally semicircular configuration is carried at its straight edge by a sleeve member 50. The sleeve member 50 is rotatably carried by the supporting shaft 42, while the sleeve member 52 is fixed to the supporting shaft 44 by means of a set screw 54 so that the vane member 48 and the supporting shaft 44 rotate together.

The housing 12 is provided with a substantially cylindrical recess 56 registering with the substantially semi-spherical surface 31 of the bowl 14. A semi-annular, radially inwardly extending flange portion 58 is formed in the housing 12 intermediate the chambers 34 and 35 and the recess 56. A second radially inwardly extending flange portion 60 is formed in the housing 12 within the central portion of the chamber 34. The chamber 34 communicates with a bore 61 extending radially through the flange portion 60 by means of a vertically disposed passageway 62 formed by the spacing between the inner face of the flange portion 60 and the vertical partition 32.

The recess 56 is formed on a radius substantially equal to the radius of the vane member 48 and on an axis substantially normal to and bisecting the axis of rotation of the vane member 48. Thus when the vane member 48 is disposed in a plane perpendicular to the partition 32, as can best be seen in FIGS. 2 and 4, the vane member 48 extends across the semi-circular space formed by the recess 56 and the partition 32 to seal the chamber 34 from the interior of the bowl 14 and the chamber 35.

The radius of the vane member 48 and the substantially semi-spherical surface 31 formed in the bowl 14 are substantially equal. Thus, if the center of the semi-spherical surface 31 and the center of a semi-sphere circumscribed by rotating the vane member 48 were coincident, the surface 31 and the semi-sphere circumscribed by the free edge of the rotating vane member 48 would continuously separate the chambers 34 and 35 into two substantially fluid tight compartments between which there would be no fluid communication. To provide an opening between the two chambers 34 and 35 which will vary in size depending upon the position of the vane member 48, the center of the semi-spherical surface 31 is displaced downwardly from the center of the semi-sphere circumscribed by the rotating vane member 48. Both centers are located along the central axis of the cylindrical housing 12 with the center of the surface 31, shown by numeral 64 (FIG. 4), disposed at a point closer to the bowl 14.

As a result, the vane member 48 substantially completely seals the chamber 34 when it is rotated to the position shown in FIG. 4. However when it is rotated counterclockwise toward the position shown in phantom lines at 66, the outer edge of the vane member 48 no longer abuts the inner surface 31 of the bowl 14 and a curved opening through which fluid may pass is thereby created about the semi-circular edge of the vane member 48. The size of this opening increases proportionally as the vane member 48 moves counterclockwise from its closed position toward the position shown in phantom lines at 66.

The outer end of the radially extending bore 61 has a threaded inlet port 70 which is adapted to receive the end of a suitable conduit (not shown) through which fluid is directed from a source of fluid such as a reservoir or the like. The chamber 35 is in the form of an enlarged semi-annularly shaped bore which is in fluid communication with a threaded outlet port 72 by means of a radially extending bore 74 and is adapted to be connected by the outlet port 72 to another conduit (not shown) leading to a suitable fluid user such as the inlet of a fluid motor.

As can best be seen in FIGS. 1, 2 and 4 a valve mechanism in the form of a valve 76 is disposed in the bore 61 for selectively controlling the rate of fluid flowing from the inlet port 70 to the interior of the bowl 14. The valve member 76 is of conventional construction and comprises an elongated, generally cylindrically shaped member 78 extending axially through a bore 80 formed in the upper wall 33. The lower portion of the member 78 is seated in a recessed portion 82 formed in the lower portion of the bore 61 within the flange 60. A wing nut 83 engages a bolt 84 extending through a longitudinal bore 86 within the valve 76. Seals 90 and 92 prevent fluid leakage from passing from the bore 61 respectively between the bores 80 and 86. When the wing nut 83 is loosened the valve 76 may be rotated by means of a handle 94 to control the rate of flow through bore 61. The lower portion of member 78 has a cut-out portion 96 which as can best be seen from FIG. 6 permits a maximum amount of fluid to flow through the bore 61 when the valve 76 is rotated to the position illustrated. The amount of flow may be reduced in varying degrees by rotating the valve 76 from a full flow position down to zero flow position so as to reduce the cross sectional area of the cut-out portion 96 from a maximum to a minimum in a manner which is well known in the construction of such valves. A pointer 98 carried by the handle 94 is adapted to point to suitable indicia on a plate 100 to indicate the position of the valve 76.

As can best be seen in FIGS. 2, 3 and 5, the outer end of the shaft 44 extends through a bore 102 formed in the sealing plug 46 and is fixedly secured within a bore 104 formed in an arm 106 of a cam member 108. The bore 102 functions as a bushing to permit rotational movement of the shaft 44. As the shaft 44 rotates in a counter-clockwise direction as viewed in FIG. 3 under the force of the fluid acting against the vane member 48, the cam member 108 will rotate in a counter-clockwise direction. Cam follower 110 is movable in response to the rotational movement of the cam member 108 and is so designed as to actuate an electrically operated signal device generally indicated at 112 to provide an electrical signal which is a function of the rate of fluid flow through the device 10. The signal is transmitted to a remotely mounted indicator (not shown) to indicate the flow rate. A plate 114 carried by the device 10 adjacent the cam follower 110 has suitable indicia placed thereon to also give a visual indication of the flow rate by means of a pointer 116 carried by the cam member 108.

A recessed portion 118 formed in the housing 12 and concentric with the shaft 44 has a low tension coil spring 120 disposed therein. One end of the coil spring 120 is fixed to a radially extending, annularly shaped flange 122 formed on the cam member arm 106, while the opposite end of the spring 120 is fixed to the housing 12 such that the spring 120 provides a slight rotational force to the shaft 44, and thus to the vane member 48 to urge the same to the closed position illustrated in FIG. 4. It is to be understood that the spring 120 is not intended to provide any measurable resisting force against fluid moving past the vane member 48. Thus the vane member 48 does not act as a valve in the sense of regulating the amount of flow but is merely responsive to the force produced by the fluid flowing through the device 10 to assume a rotated position which depends upon the rate of such flow. The rate of such flow is controlled by the valve 76.

The sealing plug 46 has a tapered pipe thread 124 which threadedly engages a mating tapered pipe thread 126 formed in an enlarged portion of the bore 40. The inner end of the sealing plug 46 has a recessed portion 127 concentric with the bore 102 in which an O-ring 128 is disposed, the inner surface of which is in a fluid sealing engagement with the outer periphery of the shaft 44 to prevent the passage of fluid. A cylindrical plate 130 having a central aperture 132 is disposed within the enlarged portion of the bore 40 and adjacent the inner end of the sealing plug 46. Coil spring 134 biases the plate 130 against the outer side portion of the O-ring 128 to provide a fluid tight seal. As the sealing plug 46 threadably engages the tapered pipe threads 126, the inner end 131 of the sealing plug is radially inwardly compressed to urge the O-ring 128 into a fluid tight seal against the outer periphery of the shaft 44 and the adjacent side of the plate 130. The compression of the inner end of the sealing plug 46 is caused by the interference between the two tapered pipe thread surfaces 124 and 126. Such an interference between the pipe thread surfaces 124 and 126 is well known in the art.

As hereinbefore described, the vane member 48 and the spring 120 offer a very slight resistance to the passing fluid, thus, the vane member 48 will be moved to its closed position only when the flow through the device 10 is non-existent, that is, when the valve 76 is rotated to a closed position. When the valve 76 is opened, the force of the fluid acting upon the vane member 48 will rotate it in a counter-clockwise direction, as viewed in FIG. 4. As the vane member 48 is so rotated, a passage is created between the curved edge of the vane member 48 and the bowl surface 31 which increases in size as the angle of rotation of the vane member 48 increases with respect to the aforementioned position. Thus, as the valve 76 is opened to permit a greater passage of flow, the vane member 48 will rotate to a position opening the passage between the vane member edge and the bowl surface 31 a sufficient amount to accommodate the particular flow passing through the valve 76. The particular configuration of the vane member 48 and the surface 31 permits a substantially equally divided graduated scale on the plate 114 such that the pointer element 116 will accurately indicate the rate of fluid flow through the device 10 at any particular time. By observing the change in the rate of flow, as indicated by the pointer 116, the desired amount of flow through the valve may be had by adjusting the valve 76. If a small amount of flow is required the valve 76 is only opened slightly till such desired rate is achieved at which time the wing nut 83 is tightened to maintain valve 76 at that desired position.

The position of the valve 76 of course determines the maximum flow of fluid through the device but its position is no indication of actual flow. The vane member 48 in combination with the pointer 116 provides an accurate indication of the actual flow through the device at all times so that if conditions within the system prevent the maximum flow which would otherwise be permitted by the position of the valve 76, the pointer 116 will indicate this flow.

The pressure of the fluid may not always be constant or vary uniformly, as for example, pressure surges in the system may cause a sudden movement of the vane member 48 and may induce disturbing back pressures in the fluid device 10. To reduce this likelihood, the surface 31 of the bowl 14 is provided with an enlarged recess 140 concentric with the pin 30. A sudden pressure surge in the fluid will cause the vane member 48 to rotate to a position against the pin 30. The pin 30 prevents the vane member 48 from rotating past its fully opened position. The pin 30 thus prevents the diminishing of the passage between the edge of the vane member and the bowl surface 31 when the flow rate through the device requires that the passage be at a maximum area. As the vane member 48 moves against the pin 30, the area past the vane member 48 is substantially increased by reason of the concentric recess 140. This relieves any sudden pressure build up which might be caused by pressure surges and thus reduces the possibility of any substantial back pressure.

Referring to FIGS. 7—10, another embodiment of the present invention is illustrated in the form of a fluid device 10 with the electrically operated signal device 112 and the cam follower 110 (FIG. 3) replaced by a flow indicator 150. The flow indicator 150 is mounted to the fluid device 10 by a bracket 152 and screws 153. The flow indicator 150 comprises a housing 154 having a bore 156 in one wall through which the cam arm 106 extends. The projecting end of the cam arm 106 is of a decreased diameter, forming a shoulder 157 against which the cam member 108 abuts. A nut 158 threadedly engages the projecting end of the cam arm 106 to securely retain the cam member 108 in position. Thus, as the shaft 44 rotates under the force of the fluid acting against the vane member 48, the cam member 108 will rotate. A cam follower 160 is movable in response to the rotational movement of the cam member 108 in a manner similar to the movement of the cam follower 110 hereinafter described, and is so designed as to actuate an electrically operated signal device 162 which is adapted to provide an electrical signal which is a function of the rate of fluid flow through the fluid device 10. The electrical signal is transmitted through wires 163 to a remotely mounted indicator, not shown, for indicating the flow rate through the fluid device 10. A boss 165, formed on one side of the housing 150, accommodates a sealing plug 166 through which the wires 163 pass externally from the housing 154. The sealing plug 166 provides a means for maintaining a fluid tight seal around the wires 163 to prevent moisture and other forms of foreign contamination from entering the interior of the housing 154.

The flow indicator 150 further comprises a pointer arm 168, the lower portion of which has an open ended slot 170 (FIGS. 7 and 10) through which a screw 172 extends to securely fasten the pointer arm 168 to the cam arm 106, such that the pointer arm 168 rotates with the cam member 108 as the shaft 44 is rotated under the force of the fluid acting on the vane member 48 within the fluid device 10. An L-shaped member 176, attached to he interior of the housing 154 by any suitable fasteners such as screws 178, has suitable indicia 180 printed on the face of the downwardly extending leg of the member 176 to form a dial which is visible through a window 182. The upper end 184 of the pointer arm 168 is adapted to traverse the indicia 180 as the cam arm 106 is rotated to thereby give a visual indication of the rate of flow through the flow device 10 similar to the manner in which the pointer 116 and the plate 114 function as hereinbefore described.

The window 182 is carried about its peripheral edge by a flange 186 which, in turn, is secured to a cover plate 188 by any suitable means, such as by welding. A suitable sealing element 189 is disposed between the outer face of the window 182 and the back side of the cover plate 188. Screws 190 (FIG. 8) extend through the cover plate to securely fasten the same to the housing 154. An annular seal 192, disposed between the juncture of the cover plate 190 and the edge of the housing 154, prevents the entry of foreign matter or the like into the interior of the housing.

It can thus be seen that the present invention provides a fluid device which may be economically constructed and which provides a highly reliable result. The fluid device in addition to providing an improved means for indicating the actual rate of flow through the device at any time also has a valve mechanism integrally formed therewith for controlling the maximum rate of fluid flow through the device.

It can also be seen that the present invention has provided a new and simple manner for providing a fluid tight seal for the coupling shaft between the fluid responsive member and an externally mounted indicator.

It is also apparent that although but two embodiments of the present invention have been described that many changes and modifications can be made therein without departing from the spirit of the invention or the scope of the appended claims.

What is claimed is as follows:

1. A fluid device comprising:
   a housing having an inlet port and an outlet port;
   passage means in said housing providing a fluid path between said inlet port and said outlet port;
   valve means disposed within said housing in said fluid path for selectively controlling the maximum rate of fluid flow between said inlet port and said outlet port;
   flow responsive means disposed in said fluid path intermediate said valve means and one of said ports and movable in response to changes in said rate of fluid flow;
   indicator means carried externally of said housing for indicating the rate of said fluid flow in response to the movement of said flow responsive means;
   said flow responsive means comprising a vane member rotatably mounted in said housing;
   a shaft rotatably mounted in said housing, said vane member being mounted to said shaft and rotatable therewith, said shaft extending externally of said housing and being operatively coupled to said indicator means;
   said indicating means carried externally of said housing comprising: a cam means carried by the extending end of said shaft and rotatable therewith; a cam follower movable in response to said cam means; electrically operated means for generating an electrical signal which is a function of the rate of said fluid flow being responsive to the movement of said cam follower; indicia means carried by said housing and viewable externally of said housing; a pointer arm carried by said shaft and rotatable therewith, said pointer arm carried by said second housing and cooperating with said indicia means for giving a visual indication of the rate of the fluid flow through said fluid device.

2. The fluid device defined in claim 1 wherein said flow responsive means is disposed in said flow path downstream of said valve means.

3. The fluid device defined in claim 1 including second indicator means mounted exteriorly of said housing and operatively coupled to said valve means for indicating the position of said valve means with respect to said flow path.

4. The fluid device defined in claim 1 wherein said flow responsive means further comprises: said housing being provided with an interior wall having a substantially semi-circular inner surface, and said vane member having a substantially semi-circular edge rotatable adjacent said semi-spherical surface; and the center of said semi-spherical surface being displaced from the center of the semi-sphere circumscribed by said circular edge upon rotation of said vane member, whereby the space between said edge and said surface varies at each rotated position of said vane member, said vane member being operatively coupled to said indicator means.

5. The fluid device defined in claim 4 wherein said vane member is disposed in said substantially semi-spherically inner surface at a point downstream of said valve means and upstream of said outlet port.

6. The fluid device defined in claim 4 including means for providing a fluid tight seal around said shaft to prevent leakage externally of said housing.

7. A fluid device comprising:
a housing having an inlet and an outlet port;
passage means in said housing providing a fluid path between said inlet and said outlet ports;
valve means disposed in said fluid path for selectively controlling the maximum rate of fluid flow between said inlet and said outlet;
flow responsive means disposed in said fluid path intermediate said valve means and one of said ports and movable in response to changes in said rate of fluid flow, said fluid responsive means comprising a vane member, means rotatably mounting said vane member in said housing intermediate said valve means and one of said ports; said housing being provided with an interior wall having a substantially semi-circular inner surface, and said vane member having a substantially semi-circular edge rotatable adjacent said semi-spherical surface; and the center of said semi-spherical surface being displaced from the center of the semi-sphere circumscribed by said circular edge upon rotation of said vane member, whereby the space between said edge and said surface varies at each rotated position of said vane members;
indicator means carried externally on said housing for indicating the rate of said flow in response to the movement of said flow responsive means;
a shaft rotatably mounted in said housing, said vane member being mounted to said shaft and rotatable therewith, said shaft extending externally of said housing being operatively coupled to said indicator means;
a circular bore having a tapered surface extending inwardly into said housing;
a circular member having an outer surface tapered toward one end thereof and a longitudinal bore extending through said circular member from said one end and to the other end thereof;
a circular recess formed in said one end concentric with said last mentioned bore; and
an O-ring disposed in said circular recess, said circular member being disposed in said circular bore with said shaft being received in said one end through said O-ring and extending through said longitudinal bore through said other end of said circular member, the tapered surfaces of said circular bore and said circular member being so sized such that said one end of said circular member is radially inwardly compressed by insertion of said circular member into said circular bore to urge said O-ring into a fluid tight sealing relationship with said shaft.

8. The fluid device defined in claim 7 wherein said circular bore surface has a tapered threaded surface and said circular member has a tapered threaded outer surface, said O-ring being compressed into a fluid sealing engagement with said shaft as said circular member is threadedly engaged with said threaded circular bore.

9. The fluid device defined in claim 7 including a plate member disposed adjacent said one end of said circular member in said circular bore, said plate member having a bore through which said shaft extends; and means biasing said plate member into a fluid sealing engagement with a side portion of said O-ring.

10. The fluid device defined in claim 9 wherein said circular bore has a threaded surface, said circular member has a threaded outer surface, said O-ring being compressed into a fluid sealing engagement with said shaft as said circular member threadably engages said threaded circular bore.

11. A fluid comprising:
a housing having an inlet port and an outlet port;
passage means in said housing providing a fluid path between said inlet port and said outlet port;
valve means disposed in said fluid path for selectively controlling the maximum rate of fluid flow between said inlet port and said outlet port;
flow responsive means disposed in said fluid path intermediate said valve means and one of said ports and movable in response to changes in said rate of fluid flow, said flow responsive means comprising a vane member, means rotatably mounting said vane member in said housing intermediate said valve means and one of said ports, said housing being provided with an interior wall having a substantially semi-circular inner surface, and said vane member having a substantially semi-circular edge rotatable adjacent said semi-spherical surface, and the center of said semi-spherical surface being displaced from the center of said semi-sphere circumscribed by said circular edge upon rotation of said vane member, whereby the space between said edge and said surface varies at each rotated position of said vane member;
indicator means carried externally on said housing for indicating the rate of fluid flow in response to the movement of said flow responsive means;
a shaft rotatably mounted in said housing, said vane member being mounted to said shaft and rotatable therewith, shaft extending externally of said housing and being operatively coupled to said indicator means, said indicating means carried externally of said housing comprising a second housing carried by said first mentioned housing; cam means carried by the extending end of said shaft and rotatable therewith, a cam follower movable in response to said cam means; electrically operated means for generating electrical signal which is a function of the rate of said fluid flow to the movement of said cam follower; indicia means carried by said housing and viewable externally of said housing; a pointer arm carried by said shaft and rotatable therewith, said pointer arm carried by said housing and cooperating with said indicia means for giving a visual indication of the amount of said fluid flow through said fluid device; and means for providing a fluid tight seal around said shaft to prevent leakage externally of said housing.

* * * * *

UNITED STATES PATENT AND TRADEMARK OFFICE
CERTIFICATE OF CORRECTION

PATENT NO. : 3,724,269
DATED : April 3, 1973
INVENTOR(S) : Nils O. Rosaen

It is certified that error appears in the above-identified patent and that said Letters Patent are hereby corrected as shown below:

Column 8, line 52 delete, "carried by";

line 53 delete, "said second housing and".

Column 10, line 53 after "therewith," insert --said--;

line 63 after "said", insert --second--.

Signed and Sealed this

Twenty-ninth Day of July 1980

[SEAL]

Attest:

SIDNEY A. DIAMOND

Attesting Officer    Commissioner of Patents and Trademarks